United States Patent

[11] 3,613,906

| [72] | Inventors | Bruce Deyo<br>686 Brightwood Drive;<br>Frank J. Klaus, 1244 Woodside Drive, both<br>of Marion, Ohio 43302 |
|---|---|---|
| [21] | Appl. No. | 38,945 |
| [22] | Filed | May 20, 1970 |
| [45] | Patented | Oct. 19, 1971 |

[54] DRILL STEM STORAGE AND HANDLING MECHANISM
12 Claims, 12 Drawing Figs.

[52] U.S. Cl. ..................................................... 214/2.5,
175/85, 214/1 BB
[51] Int. Cl. ..................................................... E21b 19/14
[50] Field of Search ........................................... 214/1 P,
2.5, 1 B, 1 BS; 175/52, 85

[56]  References Cited
UNITED STATES PATENTS
| 2,730,246 | 1/1956 | Stone ......................... | 214/2.5 |
| 3,212,593 | 10/1965 | Reischl ....................... | 214/2.5 X |

Primary Examiner—Gerald M. Forlenza
Assistant Examiner—Frank E. Werner
Attorney—Mason, Fenwick & Lawrence

ABSTRACT: Drill stem storage and handling rack for rotary blasthole drills including means in the drill mast for storing and handling a plurality of stem sections, wherein each stem storing and handling mechanism has lower and upper tracks with carriages mounting stem holding means movable horizontally along the tracks radially toward and from the axis of the drill stem. Toggle levers are connected to the carriages and moved by a power source, connected to one set of toggle levers, and means interconnecting the two sets of levers. The movement of the stems is in a horizontal direction only.

DRILL STEM STORAGE AND HANDLING MECHANISM

BACKGROUND OF THE INVENTION

This invention relates to rotary blasthole drilling machines, and more particularly to improved mechanisms on such machines for handling drill stem sections during movement between drilling and storage positions.

Mobile blasthole drilling machines which include a transporting vehicle with a pivotally mounted mast, or derrick, wherein the mast may be raised to vertical position for drilling and lowered to a horizontal position over the transport vehicle for movement from one drill hole site to another, are in common usage. Such drills usually have a drill head mounted for movement longitudinally of the mast to which the drill stem is connected for rotation and vertical movement. Additional stem sections for connection to the drill stem as drilling progresses are carried in storage racks in the mast, and means are provided for moving the sections selectively to the drill head axis for use, and from this axis to the rack for storage.

In those machines having power means for moving and storing drill stem sections, several different basic movements of the stem sections have been employed. In some instances, the stem sections are caused to follow a vertically arcuate path, being either raised or lowered at the same time they are moved laterally from the storage to the drilling position, or return to storage. This requires considerable power, for the weight of the stem section must be lifted at the same time the stem is moved laterally. There is also loss of stability as the stem moves. Another approach is to maintain a plurality of stem sections in a single rack, and move the sections sequentially along either a straight path or an arcuate path, to and from the rack. This requires means to select the sections in predetermined sequence to move the sections either from or to the rack. All of the prior mechanisms require relatively heavy handling structure and considerable power to operate.

SUMMARY OF THE INVENTION

The general object of the present invention is to provide improved drill stem section handling and storage means.

A more specific object of the invention is to provide a stem-handling mechanism which can be actuated by a smaller, and less powerful, device than conventional systems.

Another object is the provision of stem-handling means which maintain the stem sections in a more stable condition during movement.

A further object is to provide stem-handling means which will enable the use of a shorter mast, resulting in a lighter, less expensive machine.

A still more specific object of the invention is to provide stem-handling mechanism which moves the stem section horizontally to and from drilling position along a path which is radial to the drill axis.

Yet another object is the provision of mechanism of this nature which includes upper and lower stem-supporting assemblies, with means to protect the lower assembly if a stem section should fall out of the upper assembly.

Other objects of the invention will become apparent from the following description of practical embodiments thereof, when taken in conjunction with the drawings which accompany, and form part of, this specification.

DETAILED DESCRIPTION OF PREFERRED EMBODIMENTS

Figures 1, 11:
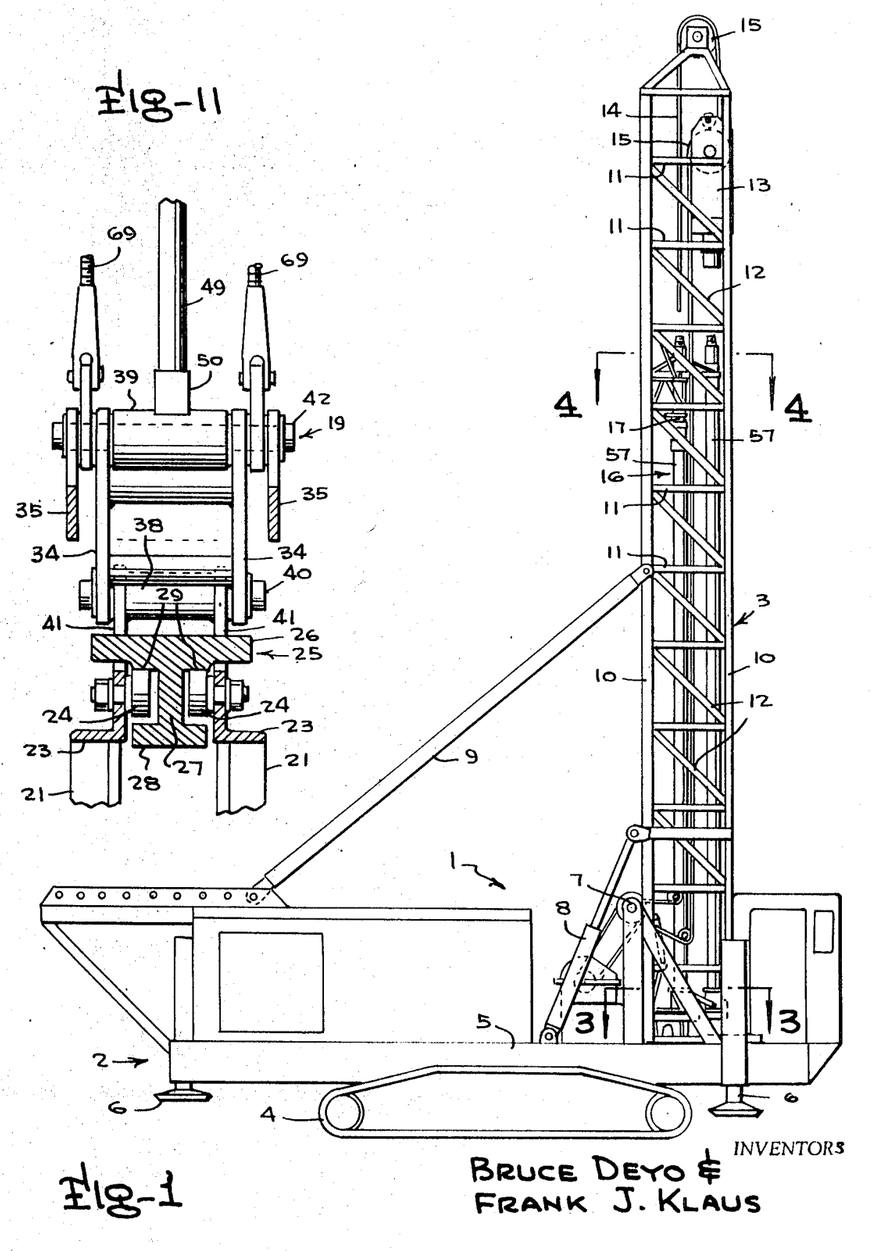
FIG. 1 is a side elevation of a blasthole drilling machine embodying the principles of the present invention.
FIG. 11 is a vertical section taken on the line 11—11 of FIG. 5.
Figure 2:
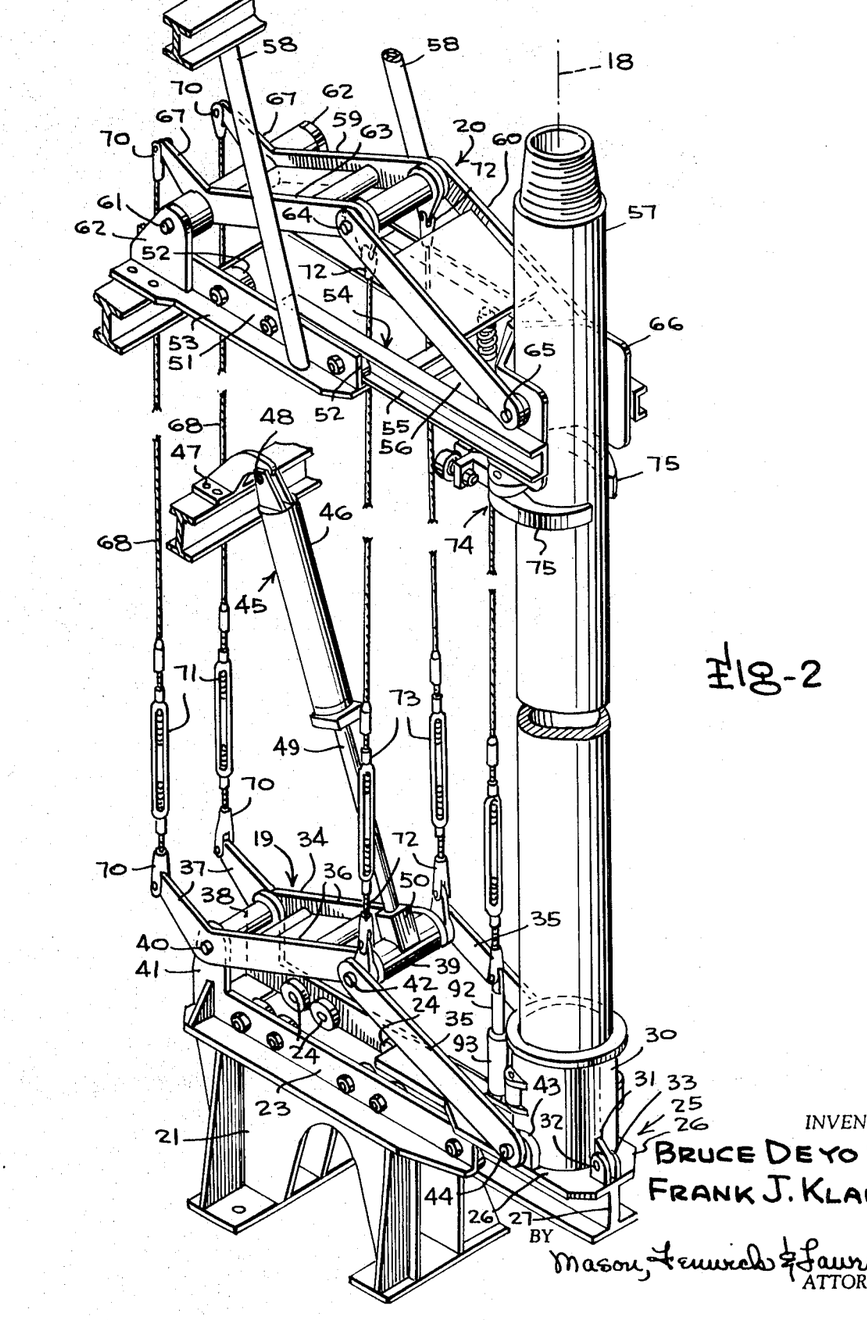
FIG. 2 is a perspective view, parts being broken away, of one section of the drill stem storage rack of the machine, illustrating the stem-handling mechanism for one stem section.

A rotary blasthole drilling machine of the general type in which the present invention is used is shown in FIG. 1. The machine 1 includes a transporting vehicle 2 and a mast 3. The transport vehicle is mounted upon crawlers 4, and includes a platform 5 upon which the mast is mounted, and which carries the usual operator's cab, machinery house, etc. Suitable outrigger stabilizers and levelers 6 are mounted at the corners of the platform. Mast 3 is pivotally mounted upon platform 5, as at 7, and is moved to the upright position shown for drilling and to a horizontal position for transportation by means of power cylinders 8, connected to the mast and to the platform. The mast is held in desired upright position by means of braces 9.

The mast 3 is an elongated member that is substantially rectangular in cross section, and is of skeletal construction, being formed of elongated corner beams 10 that are interconnected by suitable crossmembers 11 and bracing 12. The forward side of the mast is open, having no crossmembers or bracing, to permit the free movement of a drilling head 13. The drilling head is carried and driven longitudinally of the mast by means of chains 14 that pass around suitable sprockets 15 mounted on the mast and on the drill head. Adjacent to the path of movement of the drilling head 13, but completely below the uppermost position of the drilling head, there is a stem storage area 16 where sections of drilling pipe are kept for adding to the drill string as required during a drilling operation.

The foregoing description describes more or less conventional rotary blasthole drilling structure, and has been given as a background to locate and set out the purpose of the present invention relating to the stem storage rack and stem-handling mechanism in the storage area 16.

Figure 3:
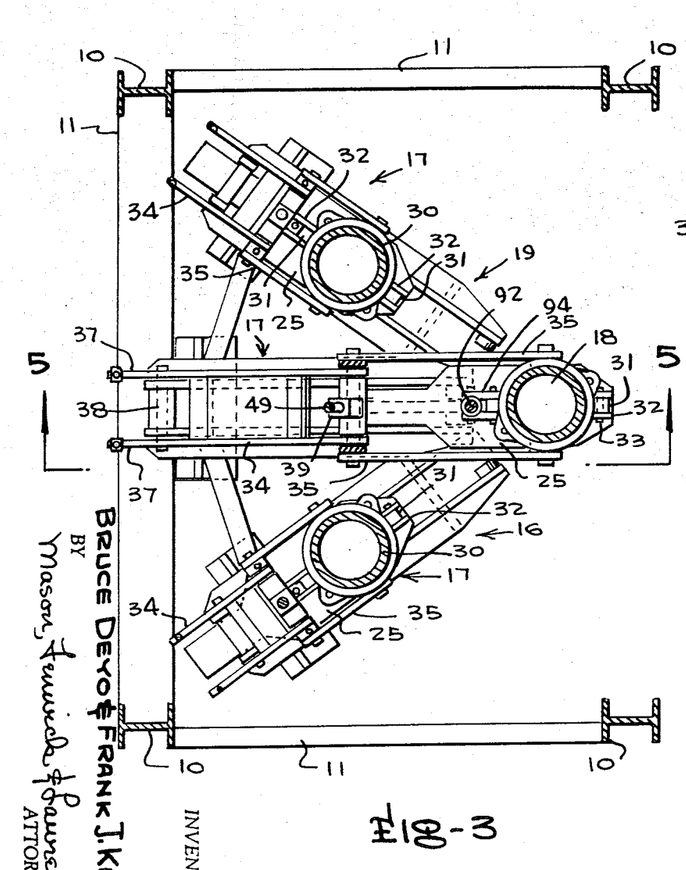
FIG. 3 is a horizontal section taken on the line 3—3 of FIG. 1, illustrating in top plan view the lower assemblies of the stem storage rack and handling mechanisms.
Figure 4:
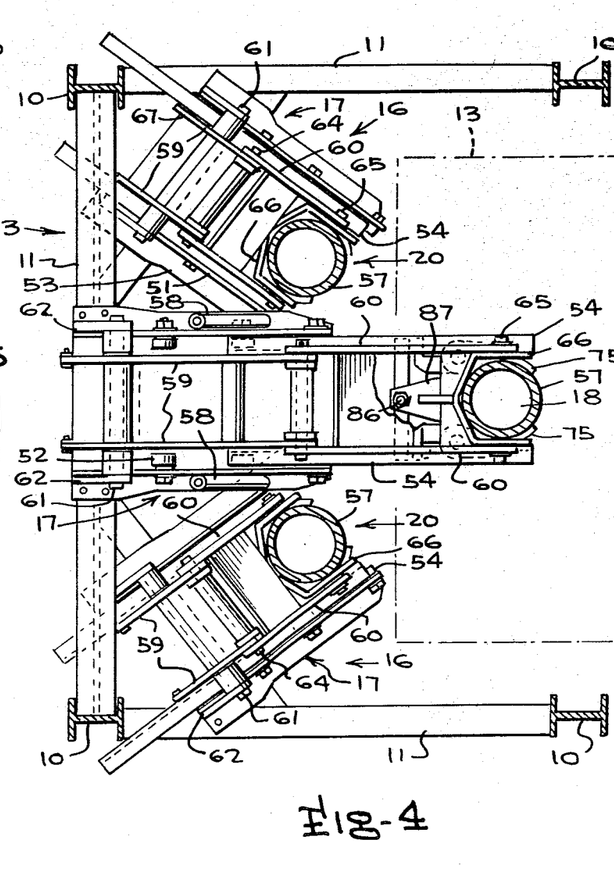
FIG. 4 is a horizontal section taken on the line 4—4 of FIG. 1, illustrating the companion upper stem-handling assemblies.
Figures 6, 10:
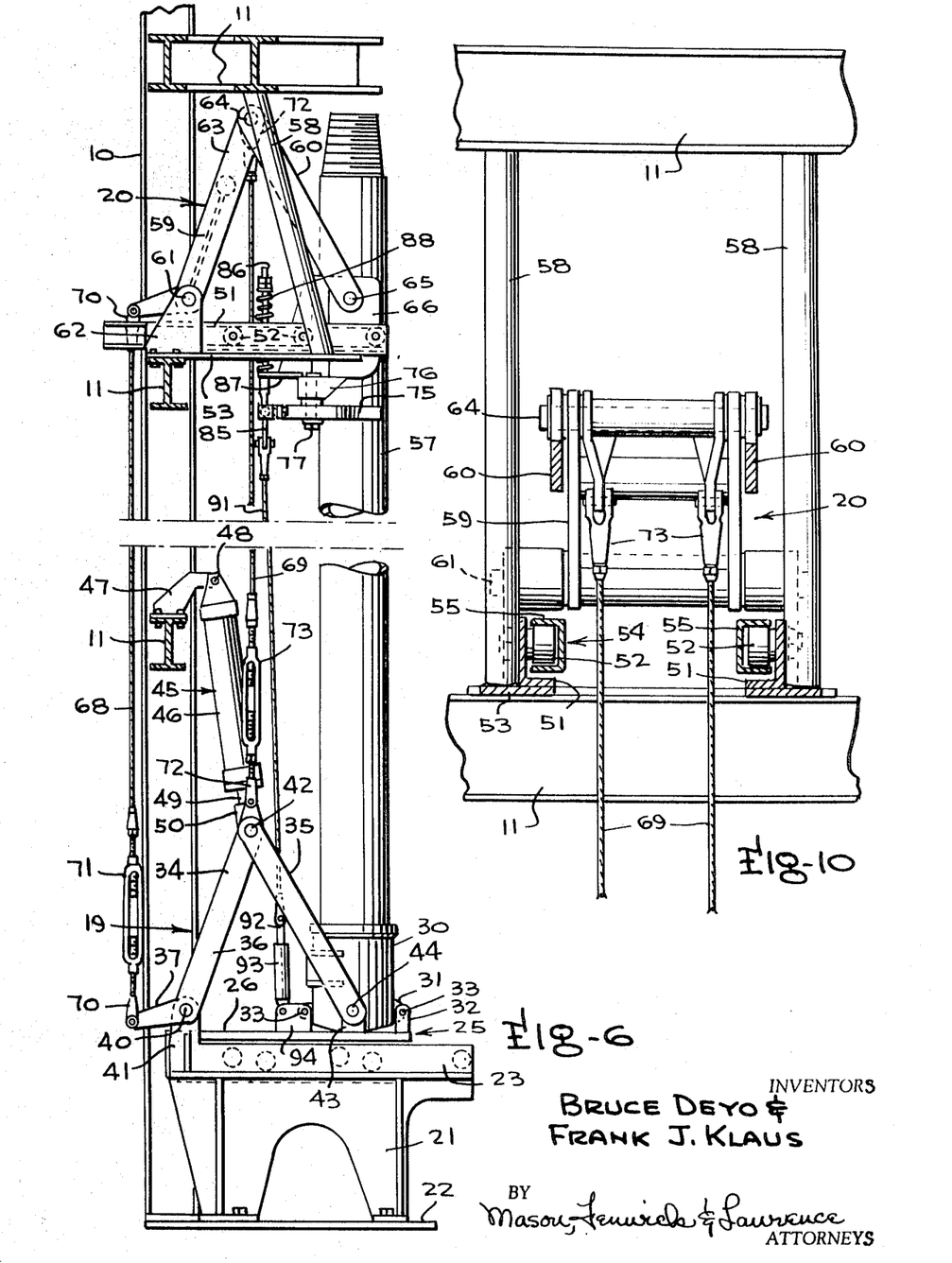
FIG. 6 is a view similar to FIG. 5, with the stem-handling mechanism being retracted and the stem section in storage position.
FIG. 10 is a vertical section taken on the line 10—10 of FIG. 5.
Figure 7:
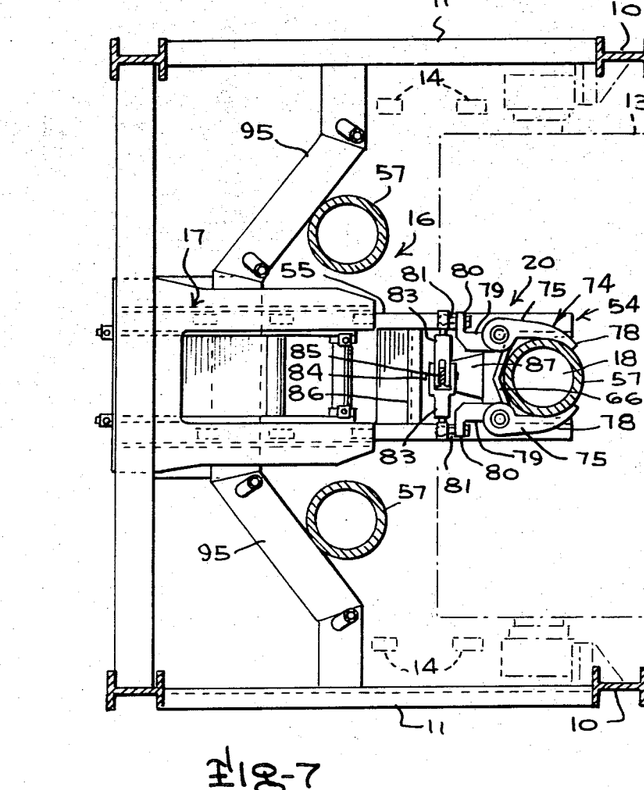
FIG. 7 is a horizontal section taken on the line 7—7 of FIG. 5.
Figure 8:
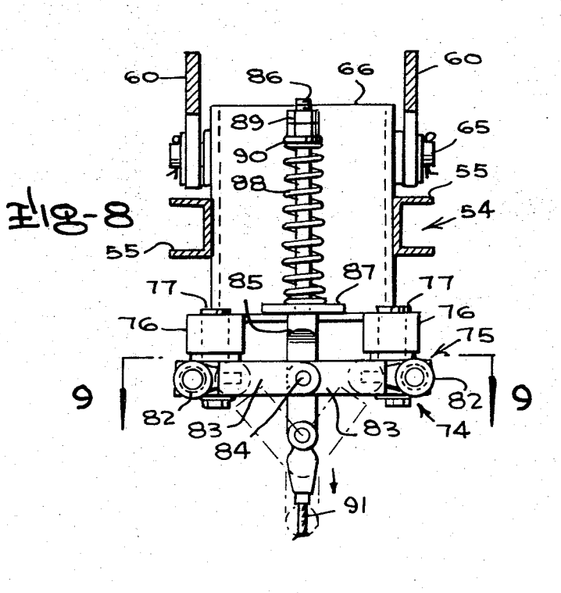
FIG. 8 is a partial vertical section taken on the line 8—8 of FIG. 5.
Figure 9:
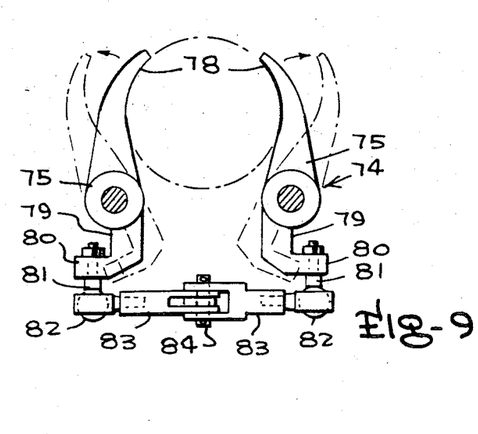
FIG. 9 is a horizontal section taken on the line 9—9 of FIG. 8.

Referring particularly to FIGS. 3, 4 and 6, it will be seen that, for purposes of disclosure, three stem storage racks and handling mechanisms 17 have been shown. These are positioned in arcuate arrangement about the extended axis of the drill head, shown at 18, which is the vertical axis of the drill stem. Each handling mechanism moves the stem section it carries radially toward and from the drill axis 18. As the three storage racks and handling mechanisms are substantially the same, only one will be described in detail.

As seen from FIGS. 2 through 6, 10 and 11, each rack and handling mechanism 17 is composed of a lower assembly 19 and an upper assembly 20. Although similar in general arrangement and operation, the two assemblies are different in specific details.

The lower assembly is mounted upon pedestals 21 rising from the base table 22 of the mast that supports the mast upon the platform 5 of the transport vehicle when the mast is in raised position. The pedestals are parallel and horizontally spaced, and terminate at their tops in horizontally extending angle members 23. The angle members support a plurality of rollers 24 upon which a carriage 25 is mounted for horizontal rolling movement. Carriage 25 has the general cross-sectional shape of an I-beam, having a rather wide top member 26, a vertical web 27, and a narrower bottom member 28. The top member carries rails 29 in its underside, on either side of the web to ride on rollers 24. The bottom member 28 underlies the rollers to hold the carriage against vertical movement.

Carriage 25 carries a stem socket 30 seated upon its top member, and having forwardly and rearwardly extending ears 31 at its bottom projecting between mounting ears 32, extending upwardly from the carriage top, and fixed to the ears by shear pins 33. This permits freeing the socket from the carriage in the event the upper assembly loses its grip on the stem, as will be described.

Movement of the carriage along the track provided by the angle members 23 and rollers 24 is accomplished by means of toggle levers 34 and 35. Levers 34 are bellcranks, consisting of operating arms 36 and upper assembly actuating arms 37. The bellcranks are spaced apart laterally, and held in spaced relation by sleeves 38 and 39 located at the junctures of the two arms and at the outer ends of the operating arms 35. Pivot pin 40, through the levers at the juncture of the arms and through the sleeve 38, mounts the levers on ears 41 upstanding from the angle members 23. The outer ends of the operating arms 36 are joined to the adjacent ends of levers 35 by pin 42, which passes through the two sets of levers and the spacing sleeve 39. The opposite ends of levers 35 are pivotally connected to ears 43 on carriage 25 by pivot pins 44.

Toggle levers 34 and 35 are caused to spread and contract, to advance and retract carriage 25 along its track, by means of a power cylinder assembly 45, having its cylinder 46 pivotally attached to a mounting bracket 47 on one of the mast frame members 11, as at 48, and its piston rod 49 pivotally connected to an ear 50 on the spacing sleeve 39.

It will be seen that extension of the power cylinder assembly 45 will cause the toggle levers to open, advancing the carriage 25 along its track to move the stem socket 30 to a position in alignment with the drill axis 18. When the cylinder assembly contracts, the carriage and stem socket are moved back to a position out of the way of the vertical movement of the drill head 13 and to a storage position for a stem section carried in the socket.

The upper assembly 20 has laterally spaced, track-forming angle members 51, carrying rollers 52. The angle members are mounted upon plates 53 mounted on one of the mast cross-members 11 at the back of the mast. A carriage 54 consisting of spaced, outwardly and oppositely opening channel members 55 connected by a bridge 56 rides on rollers 52 and mounts means for supporting the upper end of a stem section 57 seated in the stem socket 30 of the underlying lower assembly 19. In order to rigidify the assembly, plates 53 are supported by columns 58 from superimposed framework of the mast.

Carriage 54 is also moved by means of toggle levers. The levers 59 and 60 are controlled, and moved by operation of the lower assembly. Toggle levers 59 are bellcranks, and pivoted at 61 on ears 62 on plates 53. Their operating arms 63 are pivotally connected to the ends of levers 60, as at 64, and the opposite ends of levers 60 are pivotally connected at 65 to a U-shaped stem bracket 66 at the forward end of carriage 54. Levers 59 carry actuating arms 67, extending to the rear of pivot 61.

Movement of the toggle levers 59 and 60 causes the carriage 54 to advance and retract in the same manner as described for the lever carriage 25. Movement of the toggles, however, is under control of the lower assembly 19. This is accomplished by interconnecting the actuating arms 37 of the lower assembly with actuating arms 67 of the upper assembly by means of cables 68, and interconnecting the pivot 42 of the lower assembly and the similar pivot 64 of the upper assembly by cables 69. Cables 68 contain attaching clevises 70 and takeup devices 71, while cables 69 include clevises 72 and takeup devices 73. It will be seen that movement of the lower toggle levers will cause similar and simultaneous movement of the upper toggle levers. When cylinder assembly 45 operates to advance carriage 25, the downward movement of the pivot 42 is transmitted by cables 69 to the pivot 64 to draw down pivot 64 and advance upper carriage 54. Retractive movement of the cylinder assembly is transmitted from the actuating arms 37 of the lower assembly to actuating arms 67 of the upper assembly to retract carriage 54. This arrangement serves as a simple means to transmit movement of the lower assembly to the upper assembly and to assure identical movement of the two carriages and maintain a stem section in the assemblies in truly vertical position.

When a stem is in place in the socket 30 of the lower assembly, its upper end rests in the U-shaped stem bracket 66 of the upper assembly. The upper end of the stem is held in place in the bracket by means of a stem clamp 74. The clamp consists of a pair of jaws 75, with each jaw pivotally connected to an ear 76 at the bottom of bracket 66 by means of a pivot pin 77. Curved, stem-encircling arms 78 of the jaws extend from one side of the pivot, and control arms 79 project in the opposite direction. Control arms 79 have outturned ends 80 which carry studs 81 having balls 82 on their ends. The balls are received in the ends of arms 83 of a toggle-operating means for the jaws. The two arms 83 are connected at their opposite ends by pivot pin 84, which also connects to a link 85. The link carries an upstanding rod 86 that passes through an opening in a bracket 87 projecting inwardly from the bottom of the stem bracket 66. Spring 88 encircles the rod, and nuts 89 and washer 90 at the top of the rod hold the spring in position and determine its tension. Spring 88 urges the link 85 upwardly and the arms 83 of the toggle operating means to raised, in-line position. When the toggle is in this position, the jaws 75 are in stem-encircling position. Link 85 has its lower end connected by a cable 91 to the piston rod 92 of a power cylinder assembly 93 connected to an ear 94 on the stem socket 30 of the lower assembly 19. By having both cylinder assemblies 45 and 93 located in the bottom of the mast, power hoses can be considerably shortened. When cylinder 93 is actuated, link 85 will be drawn down against the tension of spring 88 to break the toggle and spread jaws 75 to release the stem. When the cylinder is retracted, spring 88 draws the parts back to their original positions.

Figure 5:
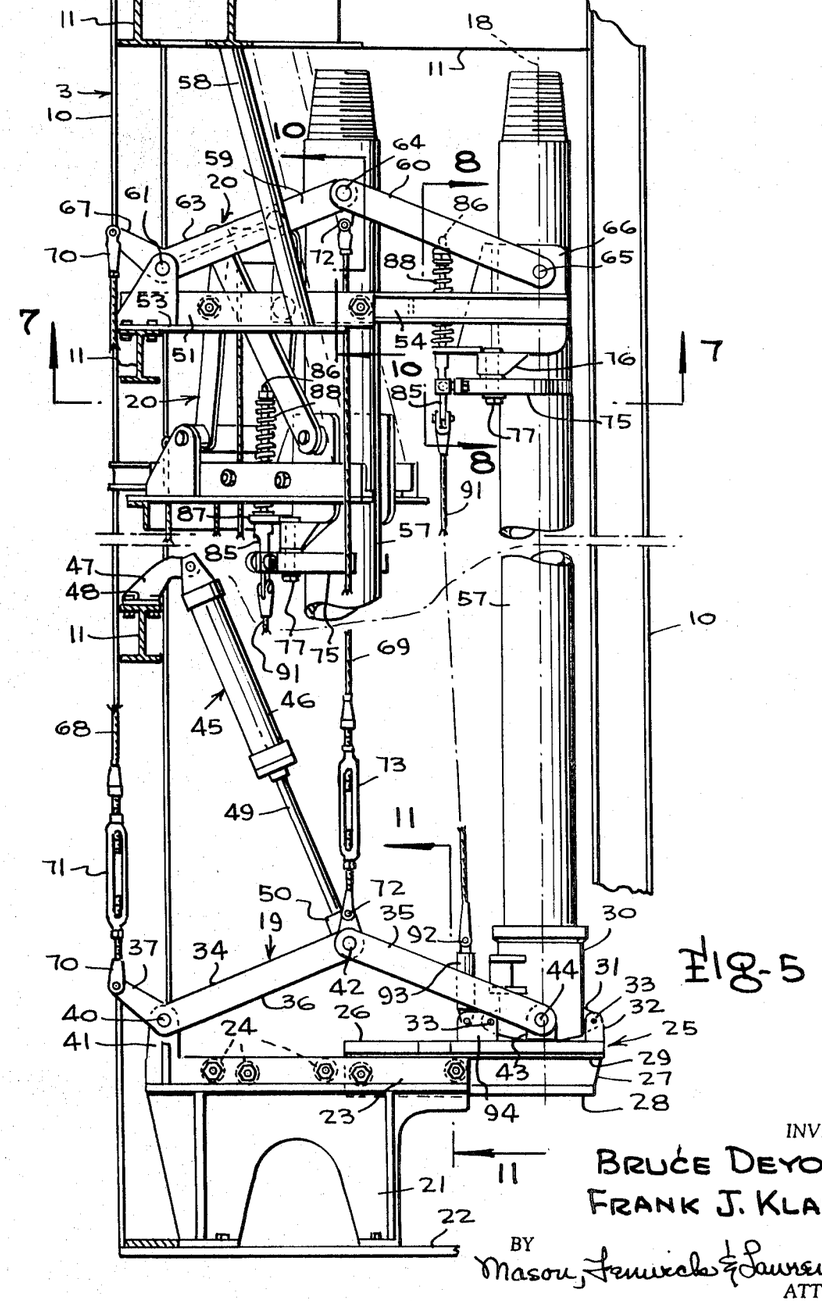
FIG. 5 is a vertical section taken on the line 5—5 of FIG. 3, showing the storage rack and stem-handling mechanism for one stem section in side elevation, with the mechanism extended to position the stem in drilling position, part of the adjacent upper assembly being shown in the background in retracted, storage position.

As stem sockets 30 of the lower assembly 19 lie wholly above the carriages 25, it is possible to arrange the radially disposed lower assemblies on the same horizontal plane and have ample space for full movement of each carriage without conflict with adjacent assemblies. With the upper assemblies, however, the stem brackets 66 and the jaws 75 and their operating mechanisms project above and below the carriages 54. In order to avoid conflict of one carriage and its appendages with another, the center assembly is positioned above the mast cross brace 11 which supports it, and the assemblies at either side have been mounted at a lower level upon framing 95 fixed to the mast structure. This is shown in FIG. 5 of the drawings. This is merely a structural convenience, and in some installations, where space permits, all of the upper assemblies may be mounted on the same horizontal plane.

Figure 12:
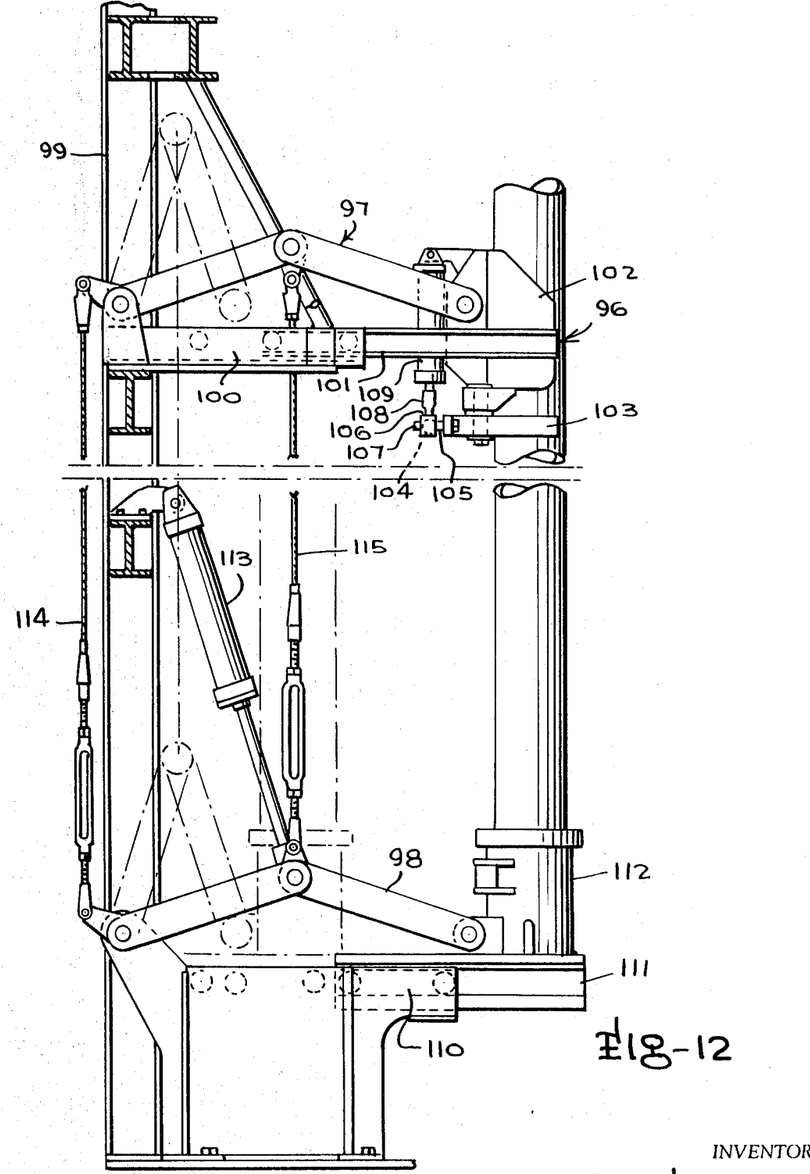
FIG. 12 is a view similar to FIG. 5, but illustrating a modified form of the invention.

Turning now to FIG. 12 of the drawings, a slightly modified stem handling mechanism is shown. In this form, the stem rack 96, consisting of the upper assemblies 97 and lower assemblies 98, is mounted in the mast 99 as before. Each upper assembly includes track 100, carriage 101, stem bracket 102 and stem-holding jaws 103. This much of the assembly is identical to the previously described form. Jaws 103, however, are not controlled by a link as before, but each jaw has the ball end 104 of its stud 105 connected to one end of a toggle arm 106, as before, but the pivot 107 which connects the arms 106 is attached to the piston rod 108 of a power cylinder assembly 109 carried by the stem bracket 102. The action is the same, but the power means is located at the upper assembly instead of the lower assembly. Although longer power hoses will be required for this arrangement, the cable interconnecting the power cylinder and toggle is eliminated.

The lower assembly is also essentially the same as before. It includes the track 110, carriage 111 and stem socket 112 mounted on the carriage. In this form, the stem socket is fixed to the carriage, and not mounted by shear pins as before. The lower assembly is operated by a power cylinder assembly 113, and the two assemblies are interconnected by the cables 114 and 115 as before.

With both forms of the invention, stem sections are mounted in each of the racks, and the handling mechanisms are retracted to hold the stem sections in stored position. When the mast is raised, and the drill stem connected to the drilling head 13 has been bored into the ground to a depth where the drilling head is near the bottom of the mast, the drill stem is secured in the stem lock (not shown) located in the mast drill table. The drilling head is then reversed, to unthread the head from the stem, and the head then raised to a level above the stem storage rack. A stem section is then selected, and the power cylinder 45 of the rack of the selected stem is activated to move the carriages 25 and 54 forwardly on their tracks to bring the stem they carry into alignment with the drill axis 18. The drilling head is then lowered onto the top of the stem and run forwardly to thread onto the stem end. The drill head is then lifted sufficiently to raise the stem from the stem socket of the lower assembly, and the power cylinder is operated to return the now empty handling mechanism to the storage position. The drill head is again lowered to bring the bottom of the newly added stem into contact with the top of the drill string, whereupon the drill head is run forwardly to thread the new stem on the string. The table lock is released, and the machine is now ready to continue drilling.

When drilling is completed, and it is desired to withdraw the drill stem and disconnect and store the various stem sections, a procedure the reverse of that just described is followed.

With the first described form of the invention, provision is made to protect the stem handling mechanism in the event the upper end of the stem should become free from the holding means and cant forward. If this occurs, the shear pins 33 will break, freeing the stem socket 30 from the carriage 25 so that no damage will result to the mechanism.

The racks and handling mechanisms of the present invention may be arranged radial to the drill axis, allowing straight line movement of the stem so that it remains stable during translation to and from storage position. The fact that movement is in a horizontal plane only results in a shorter mast and a less expensive machine. A much smaller force is required to move the mechanism, allowing use of smaller actuating devices, for there is no need to lift the weight of the mechanism and stem. Only sufficient force is required to move the devices horizontally along the roller tracks.

While in the above two practical embodiments of the invention have been disclosed, it will be understood that the specific details of construction shown and described are merely by way of illustration, and the invention may take other forms within the scope of the appended claims.

We claim:

1. Drill stem storage and handling mechanism for mounting in the masts of rotary drills, comprising an upper assembly and a lower assembly, each assembly including a horizontal track for mounting in the drill mast radially to the axis of the drill and a carriage movable longitudinally of the track, means to move the carriages simultaneously and in the same direction, means carried by the carriage of the lower assembly to support a stem vertically thereon, and means carried by the carriage of the upper assembly to engage a stem and hold it vertically over the stem-supporting means of the lower assembly carriage.

2. Drill stem storage and handling mechanism as claimed in claim 1, wherein the means to move the carriages includes an elongatable linkage connected to each carriage, power means connected to the linkage of one carriage to extend and contract the linkage, and means interconnecting the two linkages to cause them to operate in unison.

3. Drill stem storage and handling mechanism as claimed in claim 1, wherein there are frames to which the tracks are attached, and the means to move the carriages includes upper toggle levers connected respectively to the frame which carries the upper assembly track and to the upper carriage with the levers pivotally interconnected, lower toggle levers connected respectively to the frame which carries the lower assembly track and to the lower carriages with the levers pivotally interconnected, power means connected to the pivotal interconnection of one of the above-mentioned toggle levers, and means interconnecting the upper and lower toggle levers to cause them to move in unison.

4. Drill stem storage and handling mechanism as claimed in claim 3, wherein the lever of each of the upper and lower toggles connected to the frame is a bellcrank pivoted between its ends to the frame, and the means interconnecting the upper and lower toggle levers includes a cable connecting the free arms of the bellcranks, and a cable connecting the pivotal interconnections of the upper and lower toggle levers.

5. Drill stem storage and handling mechanism as claimed in claim 4, wherein the power means is a power cylinder assembly connected to the pivotal interconnection of the toggle levers of the lower assembly and to the drill mast.

6. Drill stem storage and handling mechanism as claimed in claim 5, wherein there are additional similar upper and lower assemblies on each side of the first mentioned assemblies, each having its track arranged horizontally and radially to the drill axis, and each having an independently operated power means.

7. Drill stem storage and handling mechanism as claimed in claim 5, wherein the means on the lower carriage to support the stem is a socket to seat the stem end, and the means carried by the upper carriage to engage the stem is a vertical stem-bracket and a pair of stem-embracing jaws.

8. Drill stem storage and handling mechanism as claimed in claim 7, wherein the stem socket is attached to the lower carriage by means which includes shear pins.

9. Drill stem storage and handling mechanism as claimed in claim 7, wherein the stem-embracing jaws are movable, and there are means to open and close the jaws.

10. Drill stem storage and handling mechanism as claimed in claim 9, wherein the means to open and close the jaws includes toggle levers connected to the jaws and to each other, and a power cylinder to move the jaw toggle levers.

11. Drill stem storage and handling mechanism as claimed in claim 10, wherein the power cylinder to operate the jaws is connected directly to the jaw toggle lever interconnection.

12. Drill stem storage and handling mechanism as claimed in claim 10, wherein there is a link connected to the jaw toggle lever interconnection, a spring biasing the link toward toggle lever locking position, and the power cylinder is connected to the link to move the link away from jaw toggle locking position.